United States Patent
Dillon

(10) Patent No.: US 7,540,187 B1
(45) Date of Patent: Jun. 2, 2009

(54) SIGHT GLASS APPARATUS

(76) Inventor: Robert J. Dillon, 5444 E. Twin Lake Blvd., Brooklyn Center, MN (US) 55429

(*) Notice: Subject to any disclaimer, the term of this patent is extended or adjusted under 35 U.S.C. 154(b) by 366 days.

(21) Appl. No.: 11/487,170

(22) Filed: Jul. 17, 2006

(51) Int. Cl.
*G01F 23/02* (2006.01)

(52) U.S. Cl. .............. 73/327; 73/323; 73/325; 73/326; 73/334

(58) Field of Classification Search ............ 73/323, 73/325, 326, 327, 334
See application file for complete search history.

(56) References Cited

U.S. PATENT DOCUMENTS

| | | | | |
|---|---|---|---|---|
| 1,576,897 | A | * | 3/1926 | Boizard ............ 73/327 |
| 2,704,454 | A | * | 3/1955 | Martin ............. 73/327 |
| 2,943,530 | A | | 7/1960 | Nagel |
| 3,000,345 | A | * | 9/1961 | Gray, Jr. et al. ........ 116/206 |
| 3,120,125 | A | * | 2/1964 | Vasel ............. 73/293 |
| 3,299,851 | A | * | 1/1967 | Olsen ............. 116/276 |
| 3,556,038 | A | * | 1/1971 | Wolfe ............. 114/173 |
| 3,589,191 | A | | 6/1971 | Kelch, Jr. |
| 3,664,879 | A | * | 5/1972 | Olsson ............ 429/89 |
| 4,704,983 | A | | 11/1987 | Rung |
| 5,381,264 | A | | 1/1995 | Wickholm et al. |
| 5,383,338 | A | | 1/1995 | Bowsky et al. |
| 6,578,418 | B2 | | 6/2003 | Dillon |
| D505,145 | S | * | 5/2005 | Dillon ............ D16/134 |
| 2002/0000120 | A1 | * | 1/2002 | Dillon ............ 73/327 |

* cited by examiner

*Primary Examiner*—Hezron Williams
*Assistant Examiner*—Gunnar J Gissel
(74) *Attorney, Agent, or Firm*—Richard John Bartz

(57) ABSTRACT

A sight glass apparatus providing visual information concerning the presence of absence of liquid in a refrigeration system has a sight glass with a pair of clear glass bodies secure to a housing having a chamber for the liquid. The bodies have angled prismatic surfaces. One body includes a convex lenses that directs light to a colored member that reflects a colored toroid image when the chamber is full of liquid. A moisture sensing element is mounted on the sight glass to identify the presence of water in refrigeration and air conditioning systems.

26 Claims, 5 Drawing Sheets

SIGHT GLASS APPARATUS

FIELD OF THE INVENTION

The invention relates to sight glasses providing optical information of the presence of a liquid in an enclosed container. More particularly the invention is directed to sight glasses for visually monitoring refrigerant in refrigeration and air-conditioning systems.

BACKGROUND OF THE INVENTION

The identification of refrigerant in a refrigeration and air-conditioning system is critical and failure to do so often results in difficulties. Adding too much refrigerant to the system may cause operating inefficiency, system failure, and can lead to broken tubes, fittings, and component failure due to over pressurization. A misdiagnosis of an undercharged system caused by the leaking out of the refrigerant often delays repairs. Liquid indicating sight glasses are used to allow a person to visually monitor the level of the refrigerant in refrigeration and air-conditioning systems. These sign glasses require a light source to be read correctly. The reading must be done in close proximity to the sight glasses in order to determine the presence of refrigerant in the refrigeration and air-conditioning systems.

Liquid indicating sight glasses have historically consisted of flat glasses in gasketed metal fittings that allow the inspection of the interior of a vessel or tube. Refrigeration and air-conditioning sight glasses are manufactured by fusing glass into a steel fitting. An example of this sight glass is disclosed by B. Bowsky and G. J. Scilito in U.S. Pat. No. 5,383,338. A hand-held flashlight or other light emitting device is used to direct light through the glass to identify the presence of clear or slightly translucent fluids in a vessel or tube. The difficulty with these sight glasses is that, while they can clearly identify a partially full condition, where the sight glass is only partially covered, they can be easily misread when completely full or the level of the liquid is below the bottom of the sight glass. This misreading is of particular concern and most indicative of an inexperienced observer or technician.

Alternatives are presently available such as a sight glass that has a propeller inside the sight glass that rotates when there is liquid flow. There are also sight glasses that use a series of horizontal prisms on a front sight glass that distorts the image, such as the word "FULL", printed on a surface behind the sight glass. When the narrow space between the sight glass and the surface is filled with liquid, the word "FULL" is clearly visible.

R. L. Nagel in U.S. Pat. No. 2,943,530 discloses a liquid level indicator for providing an optical stimuli as a function of electrolyte level in a battery. The level indicator is a post joined to a battery cap. The lower end of the post has a lateral extension and a notch equal to the diameter of the post. The notch is defined by plane angular and longitudinal surfaces. The bottom of post is colored green. The outside lateral surface of the extension colored red is located in lateral alignment with the upper angular surface of the notch. When the notch is full of electrolyte, the color green will be observed by viewing the top of the cap. The color red is observed when the level of the electrolyte is below the upper angular surface of the notch.

A. H. Kelch, Jr. in U.S. Pat. No. 3,589,191 discloses a reflective gauge that provides a visual indication of the volume of a liquid in a container, such as a gas tank. The gauge has transparent, spiral-like member having a plurality of stepped prismatic facet elements. Light is not reflected through the facet elements which are immersed in liquid. Light is reflected through the facet elements located above the surface of the liquid thereby providing visual information concerning the volume of liquid in the container.

R. J. Dillon in U.S. Pat. No. 6,578,418 discloses a sight glass apparatus for providing visual information regarding the level of a liquid in a tube. The sight glass has a transparent body with a convex lens and a concave lens at opposite ends of the body. The body has V-shaped grooves open to opposite sides of the body. A color pad on the concave lens is viewable at the convex lens when the tube is full of liquid.

SUMMARY OF THE INVENTION

The invention is a sight glass apparatus used to provide a person with visual information concerning the presence or absence of liquid in a chamber. The sight glass apparatus is used in refrigeration systems to visually monitor from a distance the presence or absence of a refrigerant in the systems. The sight glass apparatus has a housing with an internal chamber interposed in a tube with a passage accommodating a refrigerant. A clear glass window mounted on the housing allows entered light into the chamber. A sight glass having a pair of clear glass bodies are retained in the chamber with a fastener, such as a threaded rod, attached to the housing. The first glass body has an outwardly converging cone-shaped prismatic surface or facet and an inwardly converging cone-shaped prismatic surface or facet. The second body has a convex lens surface and an inwardly converging cone-shaped prismatic surface or facet with a circular generally flat apex engaging a circular plate. The plate has a colored skin or surface which reflects color light indicating the presence of refrigerant in the chamber and passage of the tube. The convex lens surface of the second body focuses the light on the color surface and enhances the reflected light from the surface. The reflected light expands into a large colored toroid image which is observed from a distance through the window. When the chamber is devoid of refrigerant, the cone-shaped prismatic surface of the first body reflects the light laterally whereby the observer does not see any color showing the presence of refrigerant in the chamber. The sight glass has a moisture indicating pad used to detect the presence of water in the refrigerant.

DESCRIPTION OF PREFERRED EMBODIMENTS OF THE INVENTION

Figure 1:
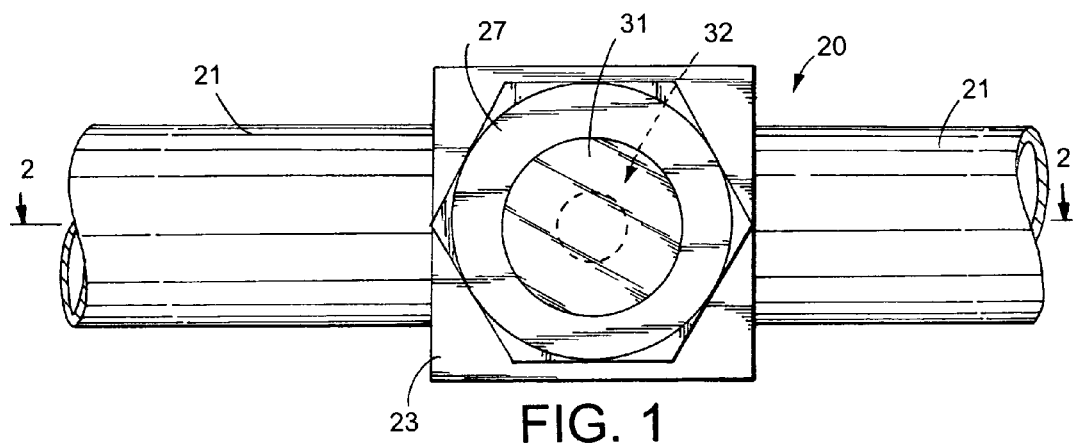
FIG. 1 is a front elevational view of the sight glass apparatus of the invention interposed in a horizontal tube for accommodating a liquid, such as a refrigerant.

The sight glass apparatus 20 of the invention, shown in FIGS. 1, 2, 9 and 10, is joined to a tube 21 for accommodating a liquid 22, such as a refrigerant in a refrigeration or air-conditioning system. An example of liquid 22 is refrigerant R134A which changes phases from a liquid to a gas and back to a liquid in a refrigeration cycle. The following description of the sight glass apparatus is directed to liquids used in refrigeration and air-conditioning systems. The sight glass apparatus 20 described herein are applicable to containers and fluid systems that accommodate clear and slightly translucent liquids. Apparatus 20 has a generally square housing 23 with an internal chamber 24. Opposite sides of housing 23 have openings 26 for the adjacent ends of tube 21 to allow liquid 22 to flow through chamber 24. The chamber 24 is in substantial horizontal alignment with the passage of tube 21. The level of liquid 22 in chamber 24 coincides with the level of liquid in tube passage 25 due to the horizontal alignment of chamber 24 and tube 21. The presence of liquid 22 in chamber 24 also indicates the presence of liquid in the passage 25 of tube 21. Housing 23 can be a tank or casing containing a clear or slightly translucent liquid. The front of housing 23 is closed with a cap 27. Cap 27 has a threaded sleeve 28 that threads into the open end of housing 23 to allow cap 27 to be attached to and removed from housing 23. Housing 23 and cap 27 are metal members, such as brass, copper, and alloys containing cooper and zinc that are compatible with liquid 22. An annular seal or O-ring 29 located between cap 27 and housing 23 maintains a tight seal between cap 27 and housing 23 to prevent escape of liquid 22 and gas from chamber 24. Cap 27 has a transparent glass window 31 closing the open end of housing 23 and allowing visual viewing of chamber 24 and sight glass 32 located in chamber 24. Sight glass 32 functions to provide visual information as to the presence or absence of liquid in chamber 24.

Figure 2:
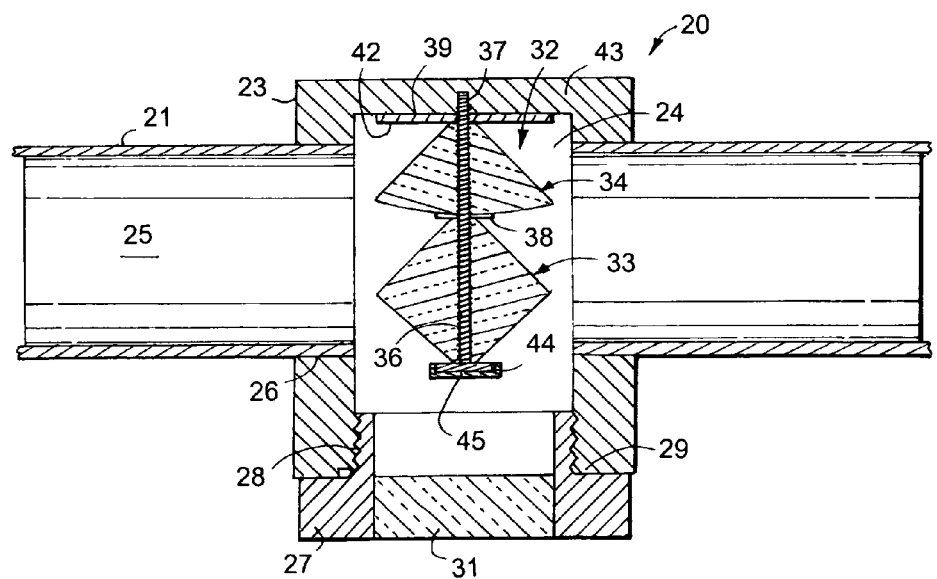
FIG. 2 is a sectional view taken along the line 2-2 of FIG. 1.
Figure 3:
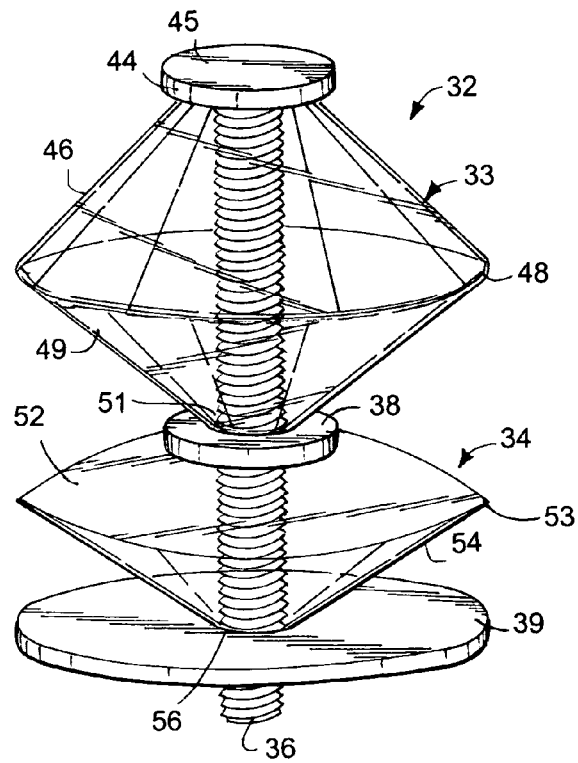
FIG. 3 is a perspective view of the sight glass located within the sight glass apparatus of FIG. 1.
Figure 4:
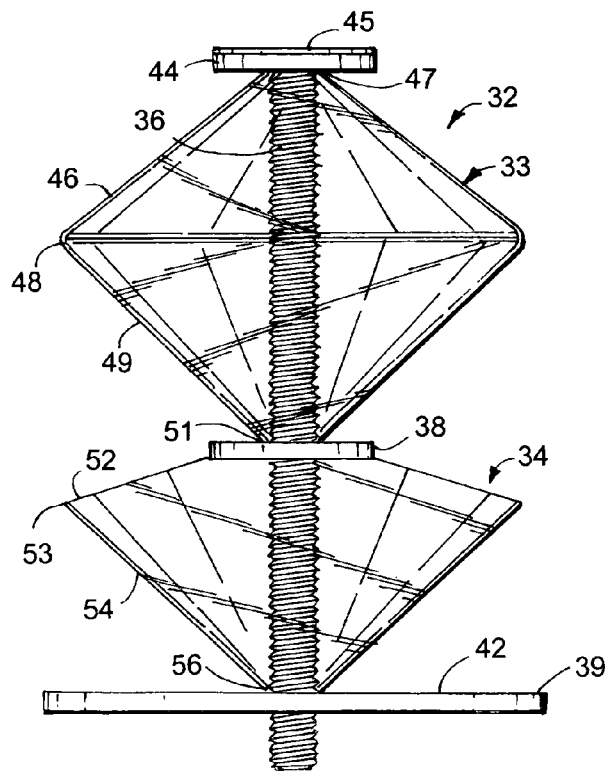
FIG. 4 is a front elevational view of the sight glass of FIG. 3.
Figure 5:
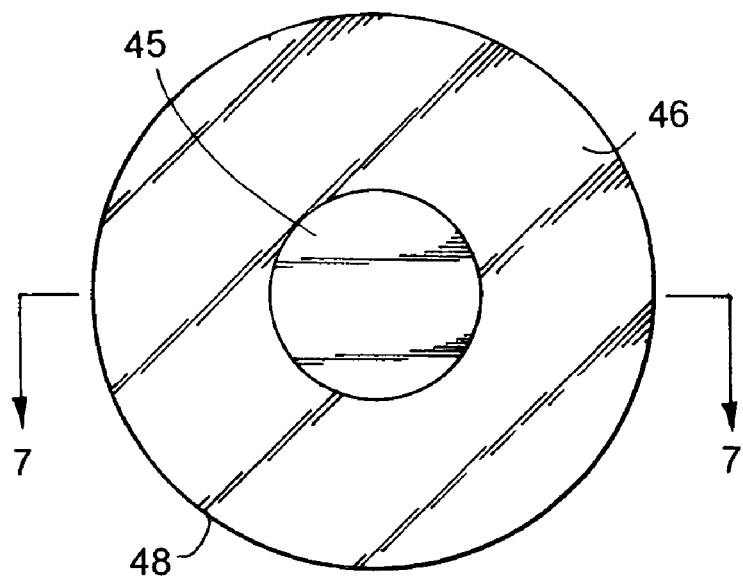
FIG. 5 is a top plan view of the sight glass of FIG. 3.
Figure 6:
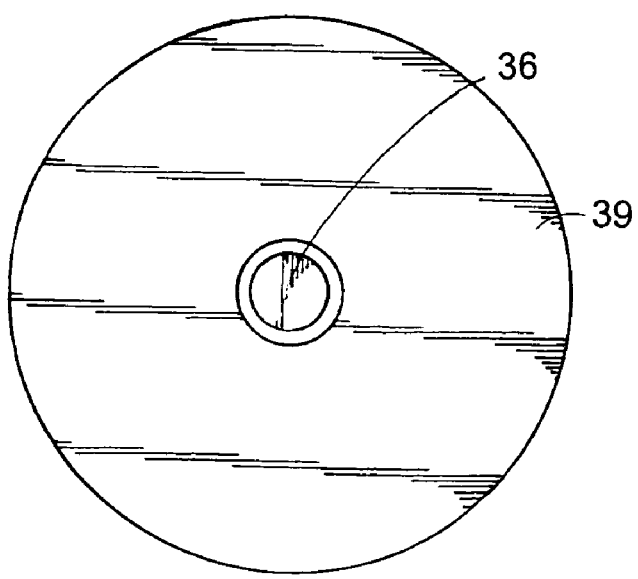
FIG. 6 is a bottom plan view of the sight glass of FIG. 3.
Figure 7:
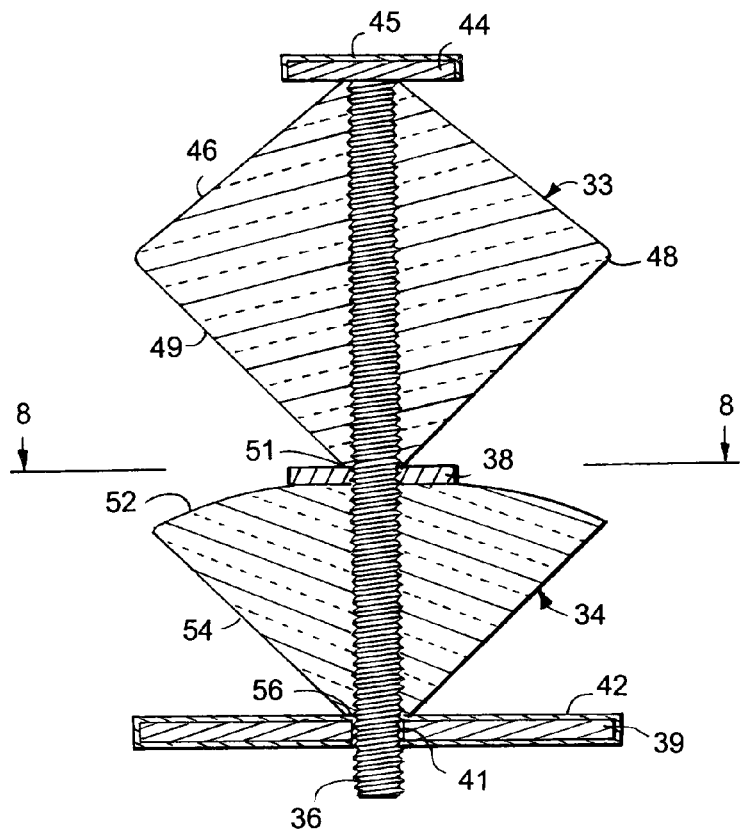
FIG. 7 is a sectional view taken along the line 7-7 of FIG. 5.
Figure 8:
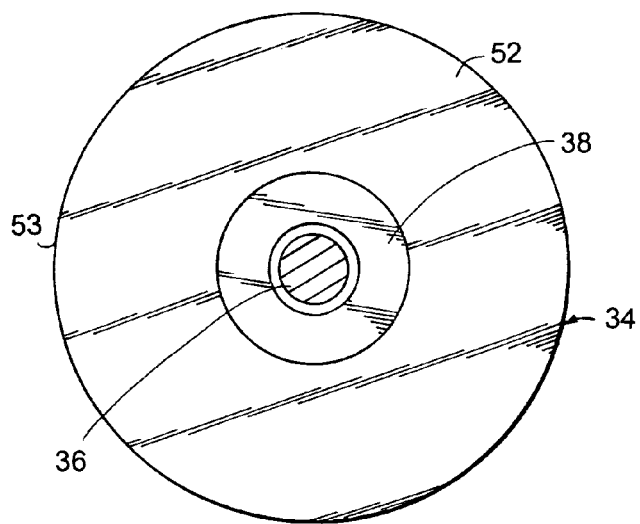
FIG. 8 is a sectional view taken along the line 8-8 of FIG. 7.
Figure 9:
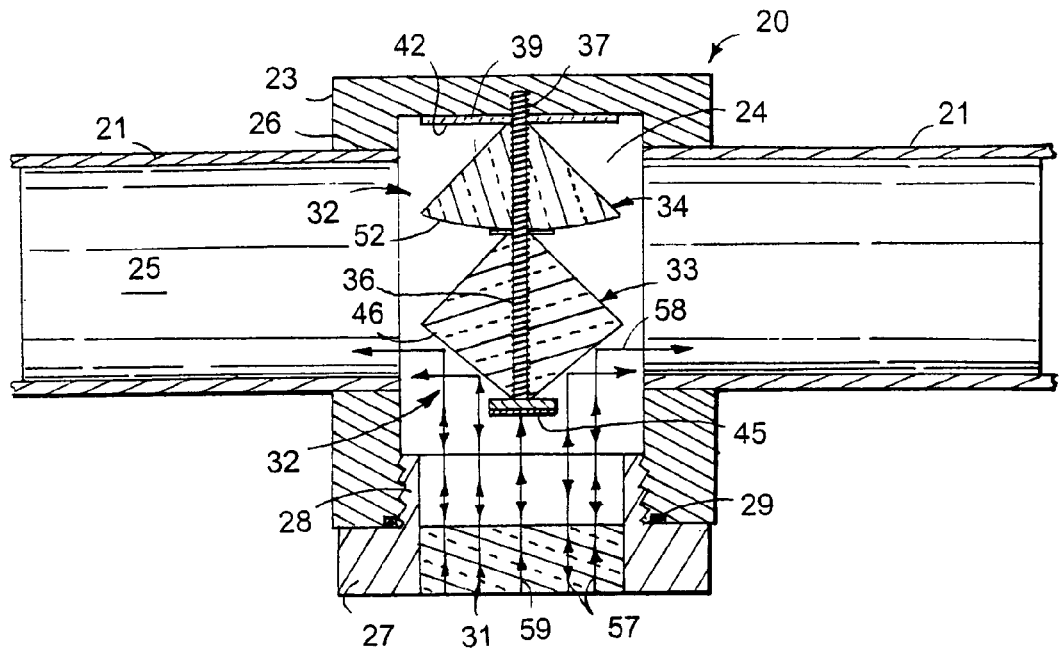
FIG. 9 is a sectional view similar to FIG. 2 showing the sight glass apparatus devoid of liquid.
Figure 10:
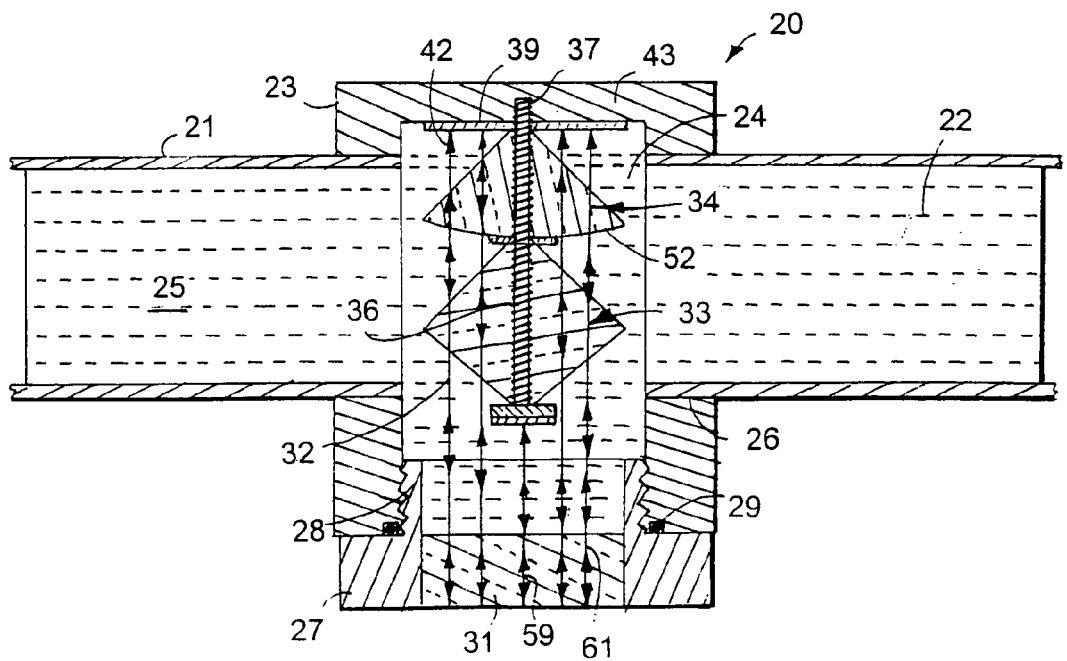
FIG. 10 is a sectional view similar to FIG. 2 showing the sight glass apparatus full of liquid.

Sight glass 32, shown in FIGS. 3 to 8, has a transparent solid first body 33 axially aligned with a transparent solid second body 34. A fastener shown as a threaded rod or belt 36 extended through bodies 33 and 34 is threaded into a blind hole 37 in end wall 43 of housing 23, as shown in FIGS. 2, 9 and 10. Rod 36 maintains bodies 33 and 34 in assembled axial alignment in chamber 24 and secured sight glass 32 to housing 23 in alignment with window 31. As shown in FIGS. 3, 4, 7 and 8, a flat washer 38 located around rod 36 separates bodies 33 and 34. A circular plate 39 having a center hole 41 and a color coating or skin 42 is located between body 34 and end wall 43. Color coating 42 is green. Other visual colors can be used for coating 42. Rod 36 has a flat head 44 at one end engaging body 33 and opposite end extended through hole 41 and threaded into blind hole 37 whereby the plate 39 is maintained in surface engagement with end wall 43 of housing 23. As shown in FIGS. 4, 7 and 8, the diameter of circular plate 39 is greater than the large diameter of the circumferential edge 53 of cone-shaped second body 34. Plate 39 can have the same diameter as circumferential edge 53. A circular pad 45 operable to indicate the presence of moisture or water in chamber 24 is secured to the top of head 44. The substance of pad 45 reacts with moisture to change the color of pad 45, such as white to red.

First Body 33 is a solid clear glass member having a cone-shaped first prismatic surface 46 converging outwardly to a circular flat apex 47 adjacent head 44. Cone-shaped surface 46 is 45 degrees relative to the longitudinal axis of body 33. Surface 46 extends to a large diameter edge 48 joined to a cone-shaped second prismatic surface 49 converging inwardly to a circular flat apex 51. Cone-shaped surface 49 is 45 degrees relative to the axis of body 33. Washer 48 engages apex 51. Body 33 is hard noncrystalline transparent silica. Other transparent glass compositions can be used for body 33. Second body 34 has a convex lens surface 52 having a large circumferential edge 42 joined to an inwardly converging cone-shaped prismatic surface 54 extended to a circular flat apex 56. Body 34 is a solid clear glass member, such as hard noncrystalline transparent silica. Other types of transparent glass compositions can be used for body 34. Body 34 has the same type of glass as body 33. The large circumference edge 53 of body 34 has the same diameter as the large circumference edge 48 of body 33. Bolt 36 threaded into bore 43 retains bodies in assembled axial alignment and retains circular plate 39 in flat surface contact with wall 43 of housing 23.

As shown in FIG. 9, chamber 24 and passage 25 is devoid of liquid. External light indicated with lines 57 pass through glass window 31 into chamber 24. Sight glass 32 is axially aligned with window 31 whereby light is reflected laterally away from cone-shaped surface 46. The observer looking at window 31 will not visually see any color or other indicia showing the presence of a liquid in chamber 24. This visual information reveals that chamber 24 is devoid of liquid. External light indicated with line 49 provides visual observation of moisture pad 45. When a color, such as red, is observed, moisture is in chamber 24. The system is purged with moisture containing liquid. New liquid such as a refrigerant, is placed in the system.

As shown in FIG. 10, chamber 24 and passage 25 is full of liquid 22. External light shown by lines 61 pass through window 31 into chamber 24. The light passes through liquid in chamber 24, first body 33. Convex lens surface 52 focuses the light on the color surface 42 and increases the intensity of the light. The enhanced light reflected from solar surface 42 is expanded into a large color toroid image which is visually observed through window 31 as a color toroid. This provides the observer with visual information that chamber 24 and passage 25 is full of liquid.

There has been shown and described an embodiment of the sight glass apparatus having the sight glass of the invention. Changes in structures and materials and arrangement of materials may be made by persons skilled in the art without departing from the invention which is defined in the following claims.

The invention claimed is:

1. A sight glass apparatus for providing visual information of the presence or absence of a liquid in a structure comprising: a housing having a chamber connectable to the structure for holding liquid in communication with the liquid in the structure, a clear window mounted on the housing allowing light to enter into the chamber and a person to view said chamber, a sight glass located in said chamber, said sight glass having a clear glass first body, a clear glass second body, and a fastener retaining said first and second bodies axially aligned with each other in said chamber and secured to said housing, said first body having an outwardly converging cone-shaped prismatic surface and an inwardly converging cone-shaped prismatic surface, said second body having a convex lens surface facing the inwardly converging cone-shaped prismatic surface of the first body and an inwardly converging cone-shaped prismatic surface, and a member having a colored surface facing the inwardly converging cone-shaped prismatic surface of the second body whereby light is directed away from the outwardly converging cone-shaped prismatic surface when the chamber is devoid of liquid and light is reflected from the colored surface of the member and entrance by the convex lens surface into a colored toroid image when the chamber is full of liquid.

2. The apparatus of claim 1 wherein: the fastener is a bolt extended axially through the first and second bodies and connected to said housing.

3. The apparatus of claim 2 wherein: said bolt includes a head cooperating with the first body to maintain the first and second bodies in assembled relationship with each other.

4. The apparatus of claim 3 including: a pad mounted on the head operable to sense the presence of water in the liquid and provide visual information as to the presence of water in the liquid.

5. The apparatus of claim 1 wherein: each of the prismatic surfaces are at an angle of about 45 degrees relative to the longitudinal axis of the bodies.

6. The apparatus of claim 1 wherein: the member is a circular plate having said colored surface.

7. The apparatus of claim 1 wherein: the first and second bodies have large circumferential edges having substantially the same diameters.

8. The apparatus of claim 7 wherein: the member having a colored surface is a circular plate having a diameter substantially the same as the diameter of the circumferential edges of the first and second bodies.

9. The apparatus of claim 1 including: a washer located between the first and second bodies axially separating the bodies.

10. A sight glass apparatus for providing visual information of the presence or absence of a liquid in a passage of a tube for carrying the liquid comprising:

a housing having a chamber for holding liquid adapted to be connected to the tube with the chamber in communication with the passage, a clear window mounted on the housing allowing light to enter into the chamber and a person to view said chamber, a sight glass located in said chamber for providing visual information of the presence or absence of a liquid in the chamber, said sight glass having a transparent first body and a transparent second body, a fastener retaining the first and second bodies axially aligned with each other in said chamber and secured to said housing, said first body having an outwardly converging cone-shaped prismatic surface facing said window located in said chamber for directing light laterally of said surface when the chamber is devoid of liquid and an inwardly converging cone-shaped prismatic surface, said second body having a convex curved lens surface facing the inwardly converging cone-shaped prismatic surface of the first body, said second body including an inwardly converging cone-shaped prismatic surface directed inwardly of the convex lens surface, and a colored surface facing the inwardly converging cone-shaped prismatic surface of the second body whereby light is reflected from the colored surface and enhanced by the convex lens surface into a colored toroid image when the chamber is full of liquid.

11. The apparatus of claim 10 wherein: the fastener securing the first and second bodies to the housing comprises a bolt extended axially through the first and second bodies and connected to said housing.

12. The apparatus of claim 11 including: means attached to the bolt for sensing the presence of water in the liquid and provide visual information as to the presence of water in the liquid.

13. The apparatus of claim 10 wherein: each cone-shaped prismatic surface is at an angle of about 45 degrees relative to the longitudinal axes of the bodies.

14. The apparatus of claim 10 including: a circular plate having said colored surface.

15. The apparatus of claim 10 wherein: the first and second bodies have large circumferential edges having substantially the same diameters.

16. The apparatus of claim 15 including: a member having a colored surface having a diameter substantially the same as the diameter of the circumferential edges of the first and second bodies.

17. The apparatus of claim 10 including: a washer located between the first and second bodies axially separating the bodies.

18. A sight glass comprising: a clear glass first body, a clear glass second body, and a fastener retaining said first and second bodies axially aligned with each other, said first body having an outwardly converging cone-shaped prismatic surface and an inwardly converging cone-shaped prismatic surface, said second body having a convex lens surface facing the first body and an inwardly converging cone-shaped prismatic surface extended from the convex lens surface, and a member having a colored surface located adjacent the inwardly converging cone-shaped prismatic surface of the second body.

19. The sight glass of claim 18 wherein: the fastener is a bolt extended axially through the first and second bodies and connected to said housing.

20. The sight glass of claim 19 wherein: said bolt includes a head cooperating with the first body to maintain the first and second bodies in assembled relationship with each other.

21. The sight glass of claim 20 including: a pad mounted on the head operable to sense the presence of water in the liquid and provide visual information as to the presence of water in the liquid.

22. The sight glass of claim 18 wherein: each of the prismatic surfaces are at an angle of about 45 degrees relative to the longitudinal axis of the bodies.

23. The sight glass of claim 18 wherein: the member is a circular plate having said colored surface.

24. The sight glass of claim 18 wherein: the first and second bodies have large circumferential edges having substantially the same diameters.

25. The sight glass of claim 24 wherein: the member having a colored surface is a circular plate having a diameter substantially the same as the diameter of the circumferential edges of the first and second bodies.

26. The sight glass of claim 18 including: a washer located between the first and second bodies axially separating the bodies.

* * * * *